United States Patent
Gulati et al.

(10) Patent No.: US 11,133,970 B2
(45) Date of Patent: Sep. 28, 2021

(54) TECHNIQUES FOR SUPPORTING MULTIPLE WAVEFORMS IN WIRELESS COMMUNICATIONS

(71) Applicant: QUALCOMM Incorporated, San Diego, CA (US)

(72) Inventors: Kapil Gulati, Hillsborough, NJ (US); Tien Viet Nguyen, Bridgewater, NJ (US); Junyi Li, Chester, NJ (US); Sudhir Kumar Baghel, Hillsborough, NJ (US); Naga Bhushan, San Diego, CA (US); Shailesh Patil, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 77 days.

(21) Appl. No.: 16/572,055

(22) Filed: Sep. 16, 2019

(65) Prior Publication Data

US 2020/0106655 A1 Apr. 2, 2020

Related U.S. Application Data

(60) Provisional application No. 62/737,637, filed on Sep. 27, 2018.

(51) Int. Cl.
*H04L 27/26* (2006.01)
*H04L 5/10* (2006.01)
(Continued)

(52) U.S. Cl.
CPC ........ *H04L 27/2636* (2013.01); *H04L 5/0051* (2013.01); *H04L 5/10* (2013.01);
(Continued)

(58) Field of Classification Search
CPC ... H04L 5/0007; H04L 5/0023; H04L 5/0051; H04L 5/10; H04L 27/2602;
(Continued)

(56) References Cited

U.S. PATENT DOCUMENTS

2010/0067591 A1* 3/2010 Luo ................. H04L 1/0028
375/260
2016/0150474 A1* 5/2016 Ang ................. H04W 52/0293
370/311
(Continued)

FOREIGN PATENT DOCUMENTS

WO 2018064306 A1 4/2018

OTHER PUBLICATIONS

International Search Report and Written Opinion—PCT/US2019/051506—ISA/EPO—dated Dec. 2, 2019.

Primary Examiner — Gary Mui
(74) Attorney, Agent, or Firm — Arent Fox, LLP

(57) ABSTRACT

Aspects described herein relate to determining multiple waveforms for transmitting wireless communications. A control waveform can be determined for transmitting a control information transmission related to a data transmission as one of multiple waveforms. A data waveform can be determined for transmitting the data transmission as one of the multiple waveforms. The control information transmission can be transmitted based on the control waveform, and the data transmission can be transmitted based on the data waveform.

29 Claims, 6 Drawing Sheets

(51) Int. Cl.
*H04L 5/00* (2006.01)
*H04W 8/24* (2009.01)
*H04W 72/04* (2009.01)

(52) U.S. Cl.
CPC ........... *H04L 27/2607* (2013.01); *H04W 8/24* (2013.01); *H04W 72/0453* (2013.01); *H04L 5/0007* (2013.01)

(58) Field of Classification Search
CPC ............ H04L 27/2607; H04L 27/2636; H04L 72/0453; H04W 48/24
See application file for complete search history.

(56) References Cited

U.S. PATENT DOCUMENTS

| | | | |
|---|---|---|---|
| 2018/0049173 A1 | 2/2018 | Chen et al. | |
| 2018/0092086 A1* | 3/2018 | Nammi | H04L 5/003 |
| 2018/0124710 A1* | 5/2018 | Ly | H04L 1/00 |
| 2018/0176946 A1* | 6/2018 | Sun | H04L 5/0037 |
| 2018/0279292 A1* | 9/2018 | Luo | H04L 1/0028 |
| 2019/0253122 A1* | 8/2019 | Yang | H04B 7/0639 |
| 2019/0253298 A1* | 8/2019 | Moroga | H04L 27/26 |
| 2019/0253866 A1* | 8/2019 | Abedini | H04L 27/261 |
| 2019/0260498 A1* | 8/2019 | Moroga | H04L 1/0003 |
| 2019/0306923 A1* | 10/2019 | Xiong | H04W 72/042 |
| 2020/0036470 A1* | 1/2020 | Olesen | H04L 1/0025 |
| 2020/0146032 A1* | 5/2020 | Bae | H04W 72/14 |
| 2020/0287688 A1* | 9/2020 | Takeda | H04W 74/004 |
| 2020/0336276 A1* | 10/2020 | Tang | H04W 72/02 |

\* cited by examiner

TECHNIQUES FOR SUPPORTING MULTIPLE WAVEFORMS IN WIRELESS COMMUNICATIONS

CLAIM OF PRIORITY UNDER 35 U.S.C. § 119

The present application for patent claims priority to Provisional Application No. 62/737,637, entitled "TECHNIQUES FOR SUPPORTING MULTIPLE WAVEFORMS IN WIRELESS COMMUNICATIONS" filed Sep. 27, 2018, which is assigned to the assignee hereof and hereby expressly incorporated by reference herein for all purposes.

BACKGROUND

Aspects of the present disclosure relate generally to wireless communication systems, and more particularly, to supporting multiple waveforms in device-to-device (D2D) communication devices, vehicle-based communication devices, and/or the like.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. In addition, 5G NR supports the use of cyclic prefix orthogonal frequency division multiplexing (CP-OFDM) waveforms and discrete Fourier transform spread orthogonal frequency division multiplexing (DFT-S-OFDM) waveforms, as configured for a user equipment (UE) by the network. As the demand for mobile broadband access continues to increase, however, further improvements in 5G communications technology and beyond may be desired.

Some wireless communication networks include vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. Without coordination from the network for such communications, however, supporting multiple waveforms for these types of communications may be challenging.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes determining a control waveform for transmitting a control information transmission related to a data transmission as one of multiple waveforms, determining a data waveform for transmitting the data transmission as one of the multiple waveforms, transmitting the control information transmission based on the control waveform, and transmitting the data transmission based on the data waveform.

In another example, a method for wireless communication is provided. The method includes receiving a control information transmission based on a control waveform, receiving a data transmission based on a data waveform, determining the control waveform for the control information transmission as one of multiple waveforms, determining the data waveform for the data transmission as one of the multiple waveforms, decoding control information from the control information transmission based on the control waveform, and decoding data from the data transmission based on the data waveform.

In a further examples, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

For example, an apparatus for wireless communication is provided that includes a transceiver, a memory configured to store instructions, and one or more processors communicatively coupled with the transceiver and the memory. The one or more processors are configured to execute the instructions to determine a control waveform for transmitting a control information transmission related to a data transmission as one of multiple waveforms, determine a data waveform for transmitting the data transmission as one of the multiple waveforms, transmit the control information transmission based on the control waveform, and transmit the data transmission based on the data waveform.

In another example, an apparatus for wireless communication is provided that includes means for determining a control waveform for transmitting a control information transmission related to a data transmission as one of multiple waveforms, means for determining a data waveform for transmitting the data transmission as one of the multiple waveforms, means for transmitting the control information transmission based on the control waveform, and means for transmitting the data transmission based on the data waveform.

In another example, a computer-readable medium, including code executable by one or more processors for wireless communication is provided. The code includes code for determining a control waveform for transmitting a control information transmission related to a data transmission as one of multiple waveforms, determining a data waveform for transmitting the data transmission as one of the multiple waveforms, transmitting the control information transmission based on the control waveform, and transmitting the data transmission based on the data waveform.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
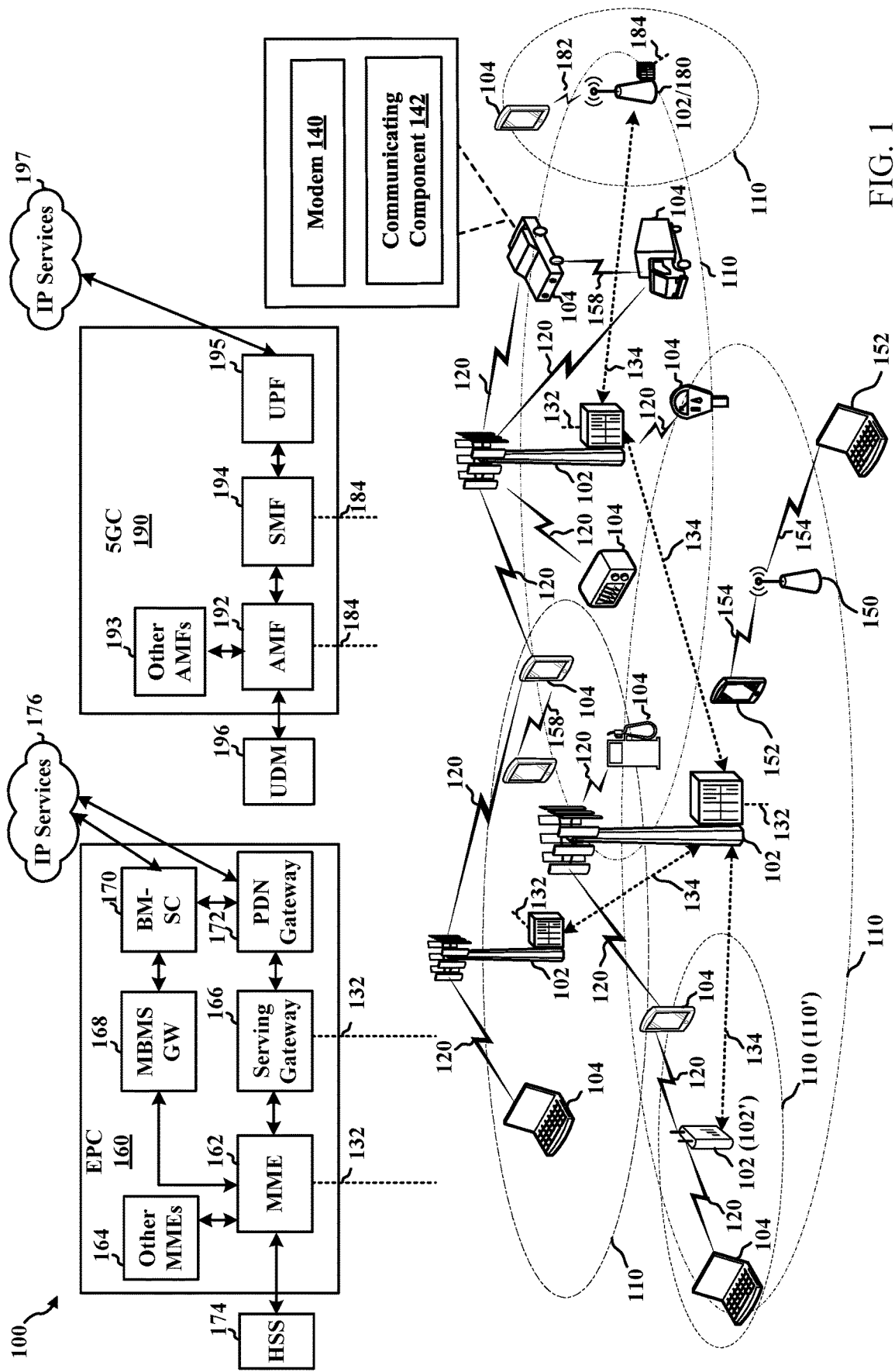
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to supporting multiple waveforms for device-to-device (D2D) communication technologies. For example, D2D communication technologies can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a sidelink channel. Support of cyclic prefix orthogonal frequency division multiplexing (CP-OFDM) waveforms and discrete Fourier transform spread orthogonal frequency division multiplexing (DFT-S-OFDM) waveforms is provided in fifth generation (5G) new radio (NR) communication technologies over the Uu interface (e.g., from gNB to user equipment (UE)). In this regard, the gNB configures the uplink waveform the UE can use to communicate with the gNB. In V2X or other D2D communications, however, the UEs, which can include vehicle-based UEs and/or infrastructure UEs, are trying to transmit/receive from multiple UEs and may not know the waveform used by a given UE for its transmission before attempting to decode the transmission.

In one attempt to address this incoherence, separate resource pools can be configured for each waveform, but this may lead to traffic segregation. Additionally, separate resource pools may complicate broadcast communications from a UE, at least by limiting the bandwidth over which the UE can broadcast a given signal using one waveform. In another attempt to address the incoherence, a distributed channel access mechanism, such as a listen-before-talk (LBT) procedure, reservation of resources for the channel, etc., can be used, but may have to be similar irrespective of the waveform types used for data/control transmission. Examples described herein can support DFT-S-OFDM waveforms to enable a common design with CP-OFDM waveforms with respect to channel access mechanisms and coexistence with CP-OFDM within the same resource pool for D2D communications.

For example, by the device-to-device nature of the communications, network coordination may not be possible for certain communications, and a device may not have an opportunity to communicate configuration information with another device before receiving communications therefrom. Thus, in order to support multiple waveforms, the devices may otherwise perform a higher number of blind decodes to detect a waveform being used for certain communications. With the possibility for many received communications and the high speed associated with wireless communications, however, increasing the number of blind decodes in this regard may become prohibitive to support latency requirements at the device.

Accordingly, aspects described herein relate to separately determining a waveform for transmitting and/or receiving control information transmissions and data transmissions in D2D communications (though similar concepts can be applied for other communications). For example, a transmitting device may determine a waveform to use based on a configuration for an associated resource pool. In addition, the transmitting device may indicate the selected waveform by using a demodulation reference signal (DM-RS), LBT sequence, or other broadcast signaling. In another example, the transmitting device may indicate the selected waveform for a data transmission in control information within the associated control information transmission (or using a DM-RS, LBT sequence, etc.). In one example, an association between the waveform of the control information transmission and the data transmission can be assumed (e.g., the same waveform used for both). In another example, the waveform can be determined based on the resource pool being used to transmit the waveform. In yet another example, blind decoding may be used (e.g., where no other indication of the waveform is received). For example, similar concepts can be used by the receiving device to determine the waveform used by the transmitting device.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, referring to the D2D communications described above, where the devices are vehicles or otherwise vehicle-based, the D2D communications between the devices (e.g., over a sidelink channel of communication link 158) can be referred to as V2V communications, which are defined for 3GPP LTE and are being defined for 5G NR. When the vehicles or vehicle-based devices communicate with other infrastructure nodes for the vehicle-based communications (e.g., over the sidelink), this can be referred to as V2I communications. When the vehicles or vehicle-based devices communicate with a base station 102 or other network node (e.g., over a communication link 120), this can be referred to as V2N communications. The collection of V2V, V2I, V2N, and/or vehicle-to-anything else can be referred to as V2X communications. In an example, LTE can support V2X communications (referred to as "LTE-V2X") for safety messages communicated between vehicles and/or from vehicles to infrastructure. 5G NR can also support V2X (referred to as "NR-V2X") for communications related to autonomous driving.

In aspects described herein, UE 104 can include a modem for communicating with other UEs (e.g., vehicle-based nodes or infrastructure nodes using D2D or V2X communications) and/or base stations in a wireless network. UE 104 can also include a communicating component 142 for determining one of multiple waveforms to use in transmitting communications to, or decoding communications received from, other UEs or network devices, as described further herein.

Figure 2:
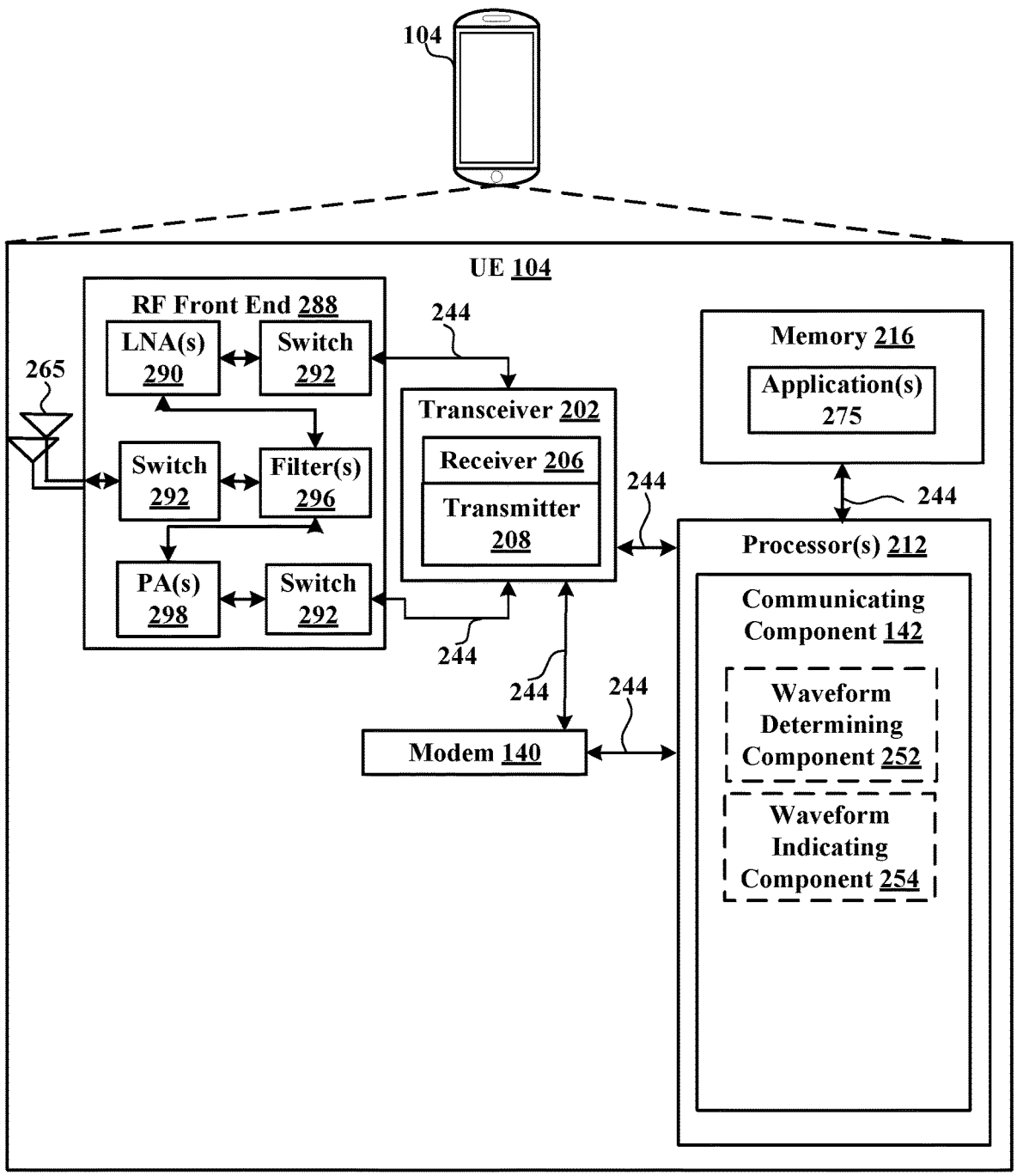
FIG. 2 is a block diagram illustrating an example of a UE, in accordance with various aspects of the present disclosure.
Figure 3:
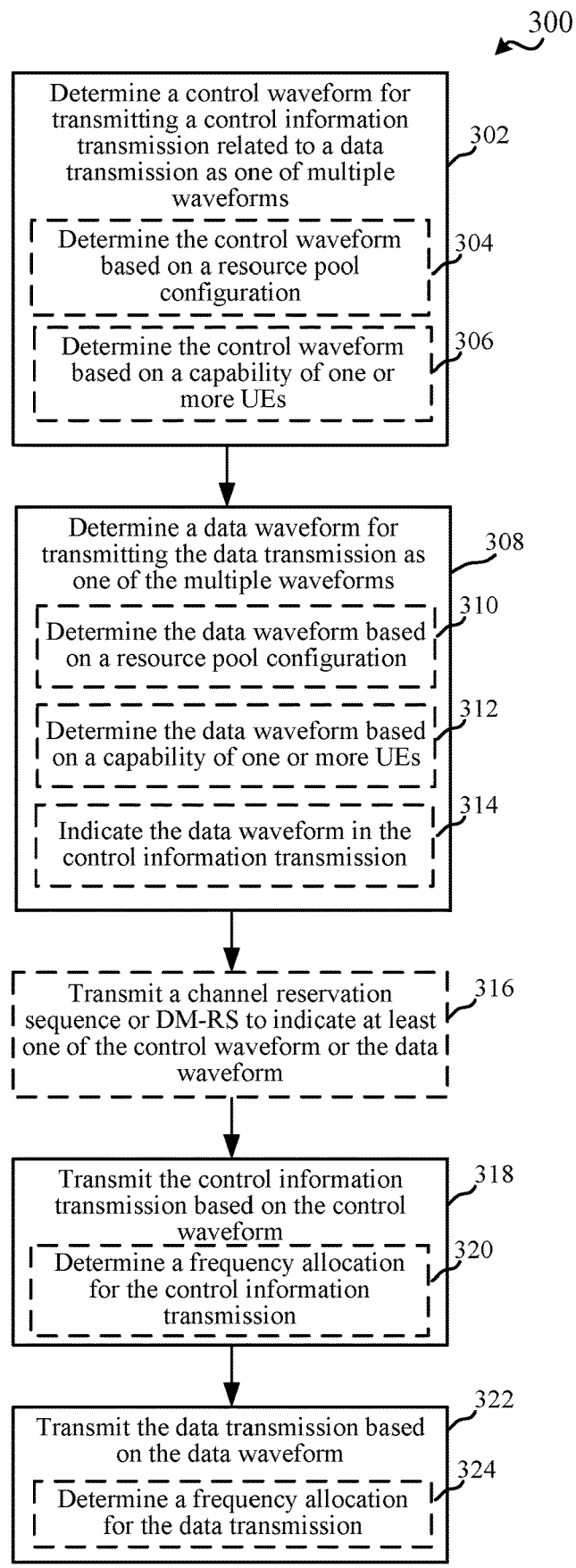
FIG. 3 is a flow chart illustrating an example of a method for determining waveforms for transmitting wireless communications, in accordance with various aspects of the present disclosure.
Figure 4:
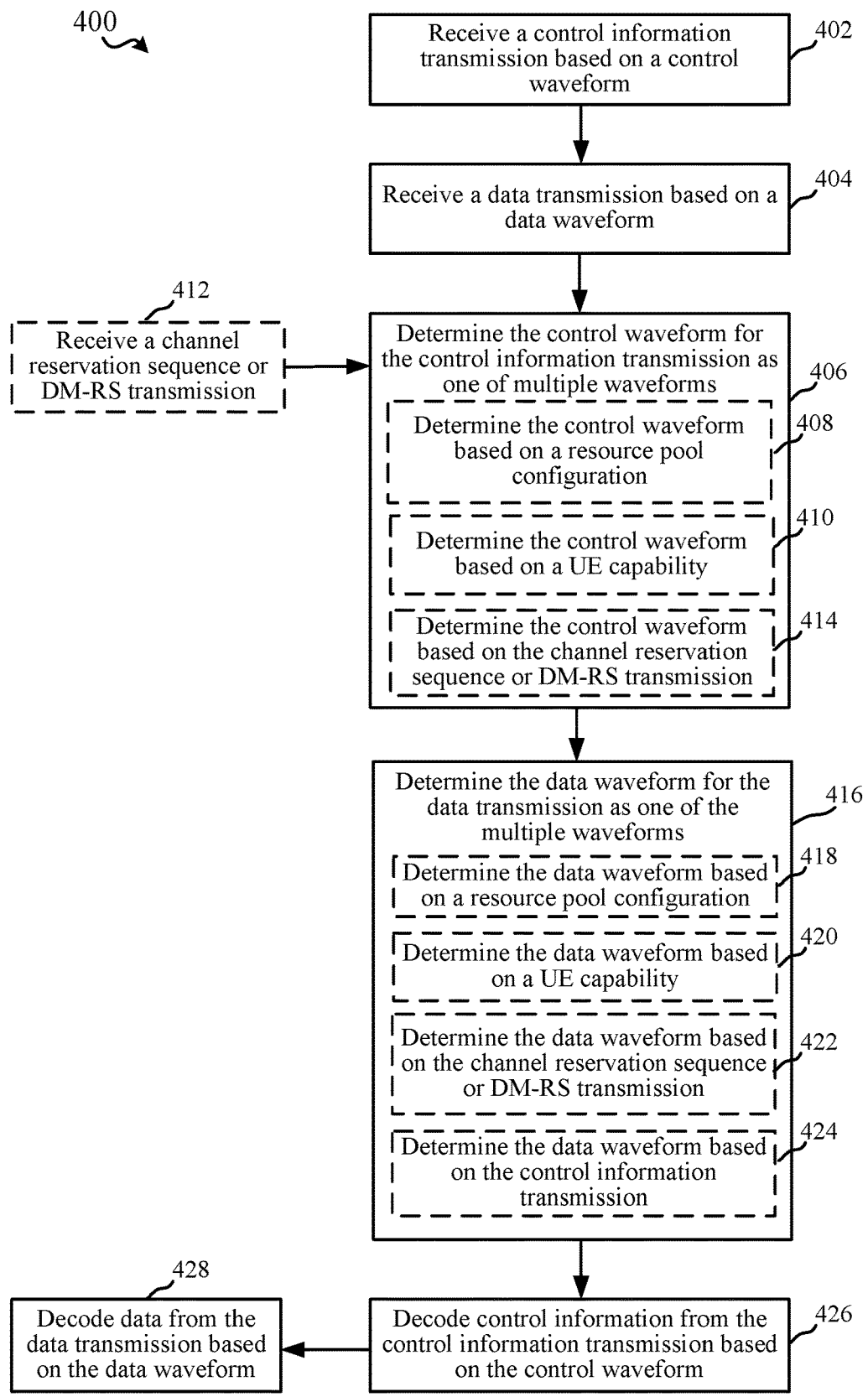
FIG. 4 is a flow chart illustrating an example of a method for determining waveforms for decoding wireless communications, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 3-4 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140 and/or communicating component 142 to enable one or more of the functions described herein related to determining a waveform for transmitting communications and/or decoding received communications.

In an aspect, the one or more processors 212 can include a modem 140 and/or can be part of the modem 140 that uses one or more modem processors. Thus, the various functions related to communicating component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with communicating component 142 may be performed by transceiver 202.

Also, memory 216 may be configured to store data used herein and/or local versions of applications 275 or communicating component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 142 and/or one or more of its subcomponents, and/or data associated therewith, when UE 104 is operating at least one processor 212 to execute communicating component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 142 can optionally include a waveform determining component 252 for determining a waveform to use in transmitting communications to other UEs or other devices in a wireless network and/or for determining a waveform to use in decoding communications from other UEs or other devices in the wireless network, and/or a waveform indicating component 254 for indicating, to other UEs or other devices in the wireless network, the waveform used in transmitting communications in the wireless network.

In an aspect, the processor(s) 212 may correspond to one or more of the processors described in connection with the UE in FIG. 6. Similarly, the memory 216 may correspond to the memory described in connection with the UE in FIG. 6.

FIG. 3 illustrates a flow chart of an example of a method 300 for determining waveforms for transmitting wireless communications. In an example, a UE 104 can perform the functions described in method 300 using one or more of the components described in FIGS. 1-2.

In method 300, at Block 302, a control waveform for transmitting a control information transmission, related to a data transmission, can be determined as one of multiple possible waveforms. In an aspect, waveform determining component 252, e.g., in conjunction with processor(s) 212, memory 216, transceiver 202, communicating component 142, etc., can determine the control waveform for transmitting the control information transmission related to the data transmission as one of the multiple waveforms. For example, the control information transmission can be over a control channel (e.g., PSCCH) and may provide information regarding the data transmission (which can be over a data channel, such as PSSCH), such as an associated resource grant for the communication. In a specific example, the multiple waveforms can include CP-OFDM, DFT-S-OFDM and/or similar waveforms.

In one example, in determining the control waveform at Block 302 in method 300, optionally at Block 304, the control waveform can be determined based on a resource pool configuration. In an aspect, waveform determining component 252, e.g., in conjunction with processor(s) 212, memory 216, transceiver 202, communicating component 142, etc., can determine the control waveform based on the resource pool configuration. In one example, the UE 104 can receive a configuration related to a resource pool from which resources can be allocated for the UE 104. The configuration can indicate one or more waveforms supported in the resource pool, along with other parameters such as associated frequency resources, associated time resources (e.g., a transmission time interval (TTI) associated with the resource pool), and/or the like. In addition, for example, the UE 104 can receive the resource pool configuration via radio resource control (RRC) signaling (e.g., from a base station, another UE, or another network node). The configuration can be received as a preconfiguration before receiving control and/or data waveforms from other devices in the network, stored in a memory of the UE 104, etc. Moreover, for example, the resource pool configuration may relate to supporting waveforms in certain resource pools as applied to transmitting the control information transmission and/or as applied to transmitting the data transmission, as described further herein. In one example, if the resource pool supports both CP-OFDM and DFT-S-OFDM, the control waveform can be determined as DFT-S-OFDM (e.g., to reach all UEs assuming the UEs support DFT-S-OFDM). For example, the configuration may include an indicator for the resource pool, which may be a bit indicator or bitmap having a value representing CP-OFDM and/or a value representing DFT-S-OFDM, or both, etc.

In another example, in determining the control waveform at Block 302 in method 300, optionally at Block 306, the control waveform can be determined based on a capability of one or more UEs. In an aspect, waveform determining component 252, e.g., in conjunction with processor(s) 212, memory 216, transceiver 202, communicating component 142, etc., can determine the control waveform based on the capability of the one or more UEs. In one example, waveform determining component 252 can determine the control waveform based on a capability of UE 104. For example, the capability of the UE 104 may relate to whether the UE 104 can support one or more of the types of waveform (e.g., CP-OFDM, DFT-S-OFDM, etc.) and/or whether the UE 104 can support the one or more types of waveforms over a specific resource pool or corresponding frequency location or channel bandwidth. In another example, waveform determining component 252 can determine the control waveform based on a capability of one or more other UEs, such as UEs within communication range of UE 104 (e.g., neighboring UEs). For example, the capability of the other UEs may relate to whether the UEs can support one or more of the types of waveform (e.g., CP-OFDM, DFT-S-OFDM, etc.) and/or whether the UEs can support the one or more types of waveforms over a specific resource pool or corresponding frequency location or channel bandwidth. The UEs and/or UE 104 can exchange this information in signaling with one another (e.g., over PSCCH and/or using broadcast signaling) and/or using an intermediate network component of the wireless network (e.g., a base station or backend core network component, etc., which may use RRC signaling, PDCCH signaling, broadcast signaling, etc.). In this example, waveform determining component 252 can determine the control waveform based on determining, from the received information, a common waveform supported by the other UEs.

In method 300, at Block 308, a data waveform for transmitting the data transmission can be determined as one of multiple waveforms. In an aspect, waveform determining component 252, e.g., in conjunction with processor(s) 212, memory 216, transceiver 202, communicating component 142, etc., can determine the data waveform for transmitting the data transmission as one of the multiple waveforms. For example, the waveform determining component 252 can determine the data waveform to be the same or different as the control waveform, and in one example can determine the data waveform based on determining the control waveform (e.g., based on the type of wave form determined as the control waveform).

As described above, for example, in determining the data waveform at Block 308 in method 300, optionally at Block 310, the data waveform can be determined based on a resource pool configuration. In an aspect, waveform determining component 252, e.g., in conjunction with processor(s) 212, memory 216, transceiver 202, communicating component 142, etc., can determine the data waveform based on the resource pool configuration. For example, the resource pool configuration can be common for the control information transmission and data transmission, and thus waveform determining component 252 can determine the data waveform to be the same as the control waveform, at least where the same resources or resources from the same resource pool are used for the data transmission as for the control information transmission. In another example, waveform determining component 252 can determine a different waveform for the data transmission where resources used for the data transmission may relate to a different resource pool than that used for the control information transmission. Still, in another example, the resource pool configuration may be different for the control information transmission and data transmission, and thus the waveform determining component 252 may determine to use different waveforms for the control information transmission and the data transmission, though the transmissions may relate to the same or similar (e.g., overlapping) resource pools. In any case, as described in one example, the waveform type can be separately indicated for one or more of the resource pools and/or for one or more of the control information transmission and/or the data transmission.

In addition, for example, in determining the data waveform at Block 308 in method 300, optionally at Block 312, the data waveform can be determined based on a capability of one or more UEs. In an aspect, waveform determining component 252, e.g., in conjunction with processor(s) 212, memory 216, transceiver 202, communicating component 142, etc., can determine the data waveform based on the capability of the one or more UEs. As described in reference to Block 306 above, this can include determining the data waveform based on a capability of UE 104 and/or a capability of one or more other UEs (e.g., as indicated by the other UEs or an intermediate node, etc.). Moreover, the capability in either case can be common for the control information transmission and the data transmission, and/or can be separate (and/or different) for each transmission or type of transmission. In this latter example, waveform determining component 252 can determine a different waveform for the data transmission based on a capability of the UE 104 and/or other UEs that is specific to data transmissions.

In an example, in determining the data waveform at Block 308 in method 300, optionally at Block 314, the data waveform can be indicated in the control information transmission. In an aspect, waveform indicating component 254, e.g., in conjunction with processor(s) 212, memory 216, transceiver 202, communicating component 142, etc., can indicate the data waveform in the control information transmission. For example, waveform determining component 252 can indicate the type of waveform for the data transmission (e.g., CP-OFDM, DFT-S-OFDM, etc.) in a value in control information as part of the control information transmission. For example, the value may include one or more values of a bit or bitmap designated to indicate the type of waveform (e.g., independently or relative to the waveform of the control information transmission). Thus, in one example, the UE receiving the control information transmission may determine the waveform for the data transmission based on this indication (if present).

Figure 5:
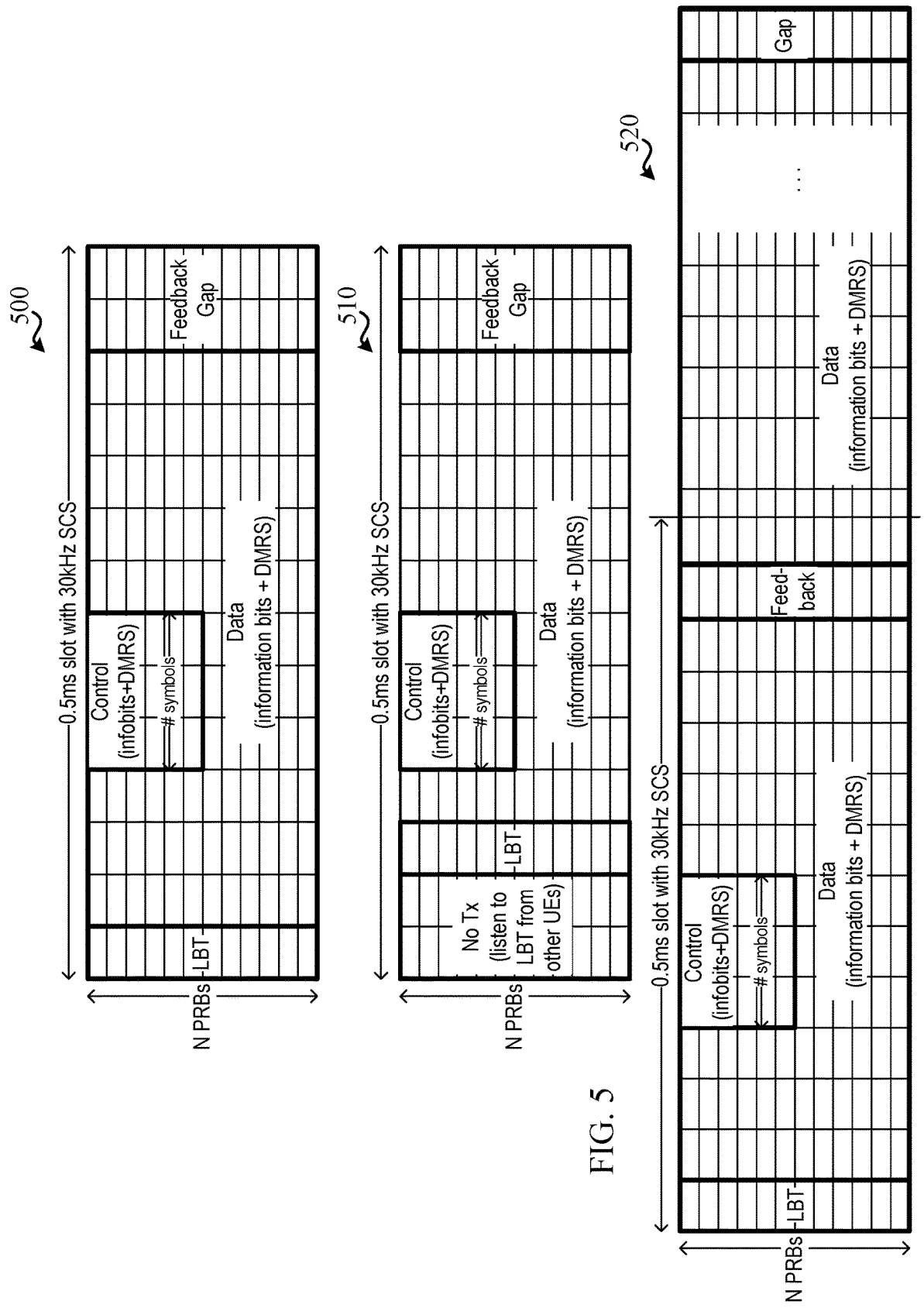
FIG. 5 is an example of resource allocation for transmitting channel reservation sequences, in accordance with various aspects of the present disclosure.

In method 300, optionally at Block 316, a channel reservation sequence or DM-RS can be transmitted to indicate at least one of the control waveform or data waveform. In an aspect, waveform indicating component 254, e.g., in conjunction with processor(s) 212, memory 216, transceiver 202, communicating component 142, etc., can transmit the channel reservation sequence or DM-RS to indicate at least one of the control waveform or the data waveform. For example, the channel reservation sequence can relate to requesting channel access using the corresponding wireless communication technology. In 5G NR, for instance, a UE can transmit a channel reservation sequence in a division of time, such as a slot or a symbol (e.g., an orthogonal frequency division multiplexing (OFDM) symbol, single-carrier frequency division multiplexing (SC-FDM) symbol, etc.) of a slot (e.g., where a slot can include multiple symbols), to access the channel, or one or more subchannels, for a determined period of time (e.g., a number of slots or symbols in the slot). Examples of resource allocations 500, 510, 520 are shown in FIG. 5 where the system bandwidth is divided into multiple subchannels (e.g., N physical resource blocks (PRBs)).

For example, waveform indicating component 254 can generate or select the channel reservation sequence and/or the DM-RS (or one or more parameters for the channel reservation sequence and/or DM-RS) to indicate the waveform for the control information transmission and/or the data transmission. For example, waveform indicating component 254 can select a cyclic shift or base sequence for the DM-RS that can be used for decoding the control information transmission, where the selected cyclic shift or base sequence can be selected to indicate the waveform for the control information transmission. In this example, a receiving UE 104 can receive the DM-RS and determine the waveform for the control information transmission based on determining the cyclic shift or base sequence of the associated DM-RS and determining the waveform to which the cyclic shift or base sequence is mapped (e.g., in a stored or received mapping). In another example, waveform indicating component 254 can select a cyclic shift or base sequence for the channel reservation sequence (e.g., LBT signal) used for reserving a channel in contention-based communications, where the selected cyclic shift or base sequence can be selected to indicate the waveform for the control information transmission. In this example, a receiving UE 104 can receive the channel reservation sequence (e.g., LBT signal) and determine the waveform for the control information transmission based on determining the cyclic shift or base sequence of the associated channel reservation sequence and determining the waveform to which the cyclic shift or base sequence is mapped (e.g., in a stored or received mapping).

In either case, the cyclic shift or base sequence selected for the channel reservation sequence and/or the DM-RS can indicate the waveform used for one of the control information transmission or the corresponding data transmission, the waveforms used for both of the control information transmission and the corresponding data transmission, etc. In one example, the cyclic shift of one or more of the channel reservation sequence and/or the DM-RS can indicate the waveform or the control information transmission while the base sequence of one or more of the channel reservation sequence and/or the DM-RS can indicate the waveform for the data transmission and/or vice versa. In another example, one of the channel reservation sequence and the DM-RS can be used to indicate (e.g., via the cyclic shift and/or the base sequence) the waveform for the control information transmission, while the other one can be used to indicate (e.g., via the cyclic shift and/or the base sequence) the waveform for the data transmission. Other combinations of using the channel reservation sequence and/or DM-RS (and/or the cyclic shift, base sequence, or other aspects thereof) to indicate a waveform are possible. In any case, the UE 104 and receiving UEs 104 can be configured to receive the channel reservation sequence and/or DM-RS and accordingly determine the waveform based on the cyclic shift, base sequence, or other property thereof, as configured in the UEs.

In another example, however, the base sequence used for DM-RS for data and control information transmissions can be the same irrespective of the corresponding waveform(s). For example, the Uu interface in NR has pseudo-random sequence/pseudo-noise sequence (PN) for CP-OFDM and Zadoff-Chu (ZC) for DFT-S-OFDM for peak-to-average power ratio (PAPR) considerations. If DM-RS is used to indicate waveform via different cyclic shift, there may be interference considerations due to coexistence (e.g., correlation between different ZC roots vs. ZC to PN correlation). In one example, communicating component 142 can determine the DM-RS base sequence to use based on the resource pool configuration (e.g., whether or not CP-OFDM and DFT-S-OFDM are both supported).

In method 300, at Block 318, the control information transmission can be transmitted based on the control waveform. In an aspect, communicating component 142, e.g., in conjunction with processor(s) 212, memory 216, transceiver 202, etc., can transmit the control information transmission based on the control waveform. For example, communicating component 142 can generate the control waveform to indicate control information in the control information transmission, and can do so based on the determined waveform type (e.g., CP-OFDM, DFT-S-OFDM, etc.). In an example, in transmitting the control information at Block 318 in method 300, optionally at Block 320, a frequency allocation for the control information transmission can be determined. In an aspect, communicating component 142, e.g., in conjunction with processor(s) 212, memory 216, transceiver 202, etc., can determine the frequency allocation for the control transmission, and can transmit the control information transmission by generating the waveform for transmission over the frequency allocation. For example, where the waveform is DFT-S-OFDM, the frequency allocation may be constrained for control information transmission (and/or data transmission, as described further herein).

Referring again to FIG. 5, UE 104, for example, can determine the number of subchannels it wants to transmit and contends for it in a distributed manner, which may include determining a LBT counter for channel access. For example, if the LBT counter=0, the UE 104 can start transmitting from symbol 1 (e.g., the second symbol), as shown in resource allocation 500 (for single slot TTI) and resource allocation 520 (for two slot TTI in slot aggregation, where the second slot can have a same number of symbols as the first slot, though shown with ellipses for ease of explanation). The transmission can include data (information bits and DMRS), as shown in resource allocations 500, 520. In addition, the UE 104 can transmit control information bits and DMRS over frequency and/or time resources (e.g., over a subchannel and/or over a number of symbols) that are chosen by the UE and/or configured for the UE 104 (e.g., by the network). If the LBT counter=1, for example, the UE 104 can listen on the first one or more symbols to determine if any other transmitter UE is using the subchannel (e.g., using LBT sequence detection), and if not, can start transmitting from symbol 3, as shown in resource allocation 510. For CP-OFDM, for example, the LBT sequence and data transmission can be of the same length (e.g., in number of subchannels). For DFT-S-OFDM, some challenges may arise as data allocations can be limited to $2^x3^y5^z$, where x, y, and z can be a set of non-negative integers, and thus may not align with the subchannel size.

In an example, a channel reservation sequence (e.g., LBT) can apply to an entire subchannel as varying size of the channel reservation sequence can make detection harder at the receiver that does not know the waveform being used and as multiple allocation sizes are possible depending on subchannel size configuration and/or desired frequency allocation of the control information transmission (or the data transmission) (e.g., in number of subchannels). In this example, communicating component 142 can determine the frequency allocation size for the control information transmission based on the waveform being used and/or based on the frequency allocation size of the channel reservation sequence (e.g., where the channel reservation sequence length can be an integral multiple of the subchannel size). For example, for CP-OFDM waveform, communicating component 142 can determine the frequency allocation for the control information transmission to be the same as the channel reservation sequence length, at least in the number of resource elements, where a resource element can include one subcarrier over one symbol, where a system bandwidth for NR communications can be divided into multiple subcarriers over frequency. For example, for DFT-S-OFDM waveform, communicating component 142 can determine the frequency allocation for the control information transmission to be a largest number equal or less than the channel reservation sequence length in number of resource elements, subject to the DFT size constraint of $2^x3^y5^z$. In addition, communicating component 142 can transmit the control information transmission to one or more other devices or UEs (e.g., in a V2X or other D2D communication, such as over a PSCCH).

In method 300, at Block 322, the data transmission can be transmitted based on the data waveform. In an aspect, communicating component 142, e.g., in conjunction with processor(s) 212, memory 216, transceiver 202, etc., can transmit the data transmission based on the data waveform. For example, communicating component 142 can generate the data waveform to indicate data in the data transmission, and can do so based on the determined waveform type (e.g., CP-OFDM, DFT-S-OFDM, etc.). In an example, in transmitting the data at Block 322 in method 300, optionally at Block 324, a frequency allocation for the data transmission can be determined. In an aspect, communicating component 142, e.g., in conjunction with processor(s) 212, memory 216, transceiver 202, etc., can determine the frequency allocation for the data transmission, and can transmit the data transmission by generating the waveform for transmission over the frequency allocation. In one example (e.g., where the data waveform is different from the control waveform), communicating component 142 can separately determine the frequency allocation for the data transmission. In another example, communicating component 142 may determine the same (or determine to use the same) frequency allocation for the control information transmission and the data transmission. In addition, communicating component 142 can transmit the data transmission to one or more other devices or UEs (e.g., in a V2X or other D2D communication, such as over a PSSCH).

FIG. 4 illustrates a flow chart of an example of a method 400 for decoding wireless communications based on a determined waveform. In an example, a UE 104 can perform the functions described in method 400 using one or more of the components described in FIGS. 1-2.

In method 400, at Block 402, a control information transmission based on a control waveform can be received. In an aspect, communicating component 142, e.g., in conjunction with processor(s) 212, memory 216, transceiver 202, etc., can receive the control information transmission based on the control waveform. As described, for example, the control waveform can be CP-OFDM, DFT-S-OFDM, etc., and can be received from one or more other devices or UEs (e.g., in a V2X or other D2D communication, such as over a PSCCH).

In method 400, at Block 404, a data transmission based on a data waveform can be received. In an aspect, communicating component 142, e.g., in conjunction with processor(s) 212, memory 216, transceiver 202, etc., can receive the data transmission based on the data waveform. As described, for example, the data waveform can be CP-OFDM, DFT-S-OFDM, etc., and can be received from one or more other devices or UEs (e.g., in a V2X or other D2D communication, such as over a PSSCH). For example, the data transmission can be related to the control information transmission (e.g., the control information transmission can specify control information for the data transmission). In addition, for example, the data transmission can accordingly be of the same waveform type as the control information transmission (or a different waveform type). In some examples, the data transmission may be received over resources the same or similar resource pool or a different resource pool. Moreover, for example, communicating component 142 can receive the data transmission over a different frequency allocation than the control information transmission, as described above.

In method 400, at Block 406, a control waveform for the control information transmission can be determined as one of multiple possible waveforms. In an aspect, waveform determining component 252, e.g., in conjunction with processor(s) 212, memory 216, transceiver 202, communicating component 142, etc., can determine the control waveform for the control information transmission as one of the multiple waveforms. In a specific example, the multiple waveforms can include CP-OFDM, DFT-S-OFDM and/or similar waveforms.

In one example, in determining the control waveform at Block 406 in method 400, optionally at Block 408, the control waveform can be determined based on a resource pool configuration. In an aspect, waveform determining component 252, e.g., in conjunction with processor(s) 212, memory 216, transceiver 202, communicating component 142, etc., can determine the control waveform based on the resource pool configuration. In one example, the UE 104 can receive a configuration related to a resource pool from which resources can be allocated for the UE 104. The configuration can indicate one or more waveforms supported in the resource pool (or one or more resource pools), along with other parameters such as associated frequency resources, associated time resources (e.g., a transmission time interval (TTI) associated with the resource pool), and/or the like. In addition, for example, the UE 104 can receive the resource pool configuration via radio resource control (RRC) signaling (e.g., from a base station, another UE, or another network node). Moreover, for example, the resource pool configuration may relate to supported waveforms in certain resource pools as applied to receiving the control information transmission and/or as applied to receiving the data transmission, as described further herein. In an example, waveform determining component 252 can determine the resource pool associated with the received control information and can accordingly determine the waveform (e.g., the type of waveform as being CP-OFDM, DFT-S-OFDM, etc.) based on an indicator for the resource pool in the resource pool configuration.

In another example, in determining the control waveform at Block 406 in method 400, optionally at Block 410, the control waveform can be determined based on a capability of one or more UEs. In an aspect, waveform determining component 252, e.g., in conjunction with processor(s) 212, memory 216, transceiver 202, communicating component 142, etc., can determine the control waveform based on the capability of the one or more UEs. In one example, waveform determining component 252 can determine the control waveform based on a capability of UE 104. For example, the capability of the UE 104 may relate to whether the UE 104 can support one or more of the types of waveform (e.g., CP-OFDM, DFT-S-OFDM, etc.) and/or whether the UE 104 can support the one or more types of waveforms over a specific resource pool or corresponding frequency location or channel bandwidth. In another example, waveform determining component 252 can determine the control waveform based on a capability of one or more other UEs, such as UEs within communication range of UE 104 (e.g., neighboring UEs). For example, the capability of the other UEs may relate to whether the UEs can support one or more of the types of waveform (e.g., CP-OFDM, DFT-S-OFDM, etc.) and/or whether the UEs can support the one or more types of waveforms over a specific resource pool or corresponding frequency location or channel bandwidth. The UEs and/or UE 104 can exchange this information in signaling with one another and/or by using an intermediate network component of the wireless network (e.g., a base station or backend core network component, etc.), as described. In this example, waveform determining component 252 can determine the control waveform based on a common waveform supported by the other UEs.

In another example in method 400, optionally at Block 412, a channel reservation sequence or DM-RS transmission can be received. In an aspect, communicating component 142, e.g., in conjunction with processor(s) 212, memory 216, transceiver 202, etc., can receive the channel reservation sequence (e.g., an LBT sequence) or the DM-RS transmission. For example, the channel reservation sequence may relate to acquiring the channel to transmit the control information transmission and data transmission, and/or the DM-RS may be transmitted to facilitate estimating the channel for the received control information transmission and/or data transmission. As described above, the channel reservation sequence and/or DM-RS can be transmitted in such a way to indicate the control waveform and/or the data waveform (e.g., based on a cyclic shift, base sequence, or other property thereof that can be selected to indicate the waveform—e.g., to indicate the waveform type as being CP-OFDM, DFT-S-OFDM, etc.).

Thus, in one example, in determining the control waveform at Block 406 in method 400, optionally at Block 414, the control waveform can be determined based on the channel reservation sequence or the DM-RS transmission. In an aspect, waveform determining component 252, e.g., in conjunction with processor(s) 212, memory 216, transceiver 202, communicating component 142, etc., can determine the control waveform based on the channel reservation sequence or the DM-RS transmission. For example, waveform determining component 252 can determine one or more properties of the channel reservation sequence or the DM-RS transmission, such as a cyclic shift, base sequence, etc., thereof, and can accordingly determine the waveform for the control information transmission and/or for the data transmission, as described above. In an example, UE 104 can be configured with logic and/or parameters, mappings, etc. for determining which properties of the channel reservation sequence and/or DM-RS correspond to which waveform types (e.g., CP-OFDM, DFT-S-OFDM, etc.) for the control waveform and/or data waveform.

In method 400, at Block 416, a data waveform for the data transmission can be determined as one of multiple waveforms. In an aspect, waveform determining component 252, e.g., in conjunction with processor(s) 212, memory 216, transceiver 202, communicating component 142, etc., can determine the data waveform for the data transmission as one of the multiple waveforms. For example, the waveform determining component 252 can determine the data waveform to be the same or different as the control waveform, and in one example can determine the data waveform based on determining the control waveform. As described above, for example, in determining the data waveform at Block 416 in method 400, optionally at Block 418, the data waveform can be determined based on a resource pool configuration. In an aspect, waveform determining component 252, e.g., in conjunction with processor(s) 212, memory 216, transceiver 202, communicating component 142, etc., can determine the data waveform based on the resource pool configuration. For example, the resource pool configuration can be common for the control information transmission and data transmission, and thus waveform determining component 252 can determine the data waveform to be the same as the control waveform, at least where the same resources or resources from the same pool are used for the data transmission as for the control information transmission. In another example, waveform determining component 252 can determine a different waveform for the data transmission where the data transmission may relate to a different resource pool than that used for the control information transmission. Still, in another example, the resource pool configuration may be different for the control information transmission and data transmission, and thus the waveform determining component 252 may determine (e.g., based on the resource pool configuration and the different resource pools) to use different waveforms for the control information transmission and the data transmission though the transmissions may relate to the same or similar (e.g., overlapping) resource pools.

In addition, for example, in determining the data waveform at Block 416 in method 400, optionally at Block 420, the data waveform can be determined based on a capability of one or more UEs. In an aspect, waveform determining component 252, e.g., in conjunction with processor(s) 212, memory 216, transceiver 202, communicating component 142, etc., can determine the data waveform based on the capability of the one or more UEs. As described, this can include determining the data waveform based on a capability of UE 104 and/or a capability of one or more other UEs. Moreover, the capability in either case can be common for the control information transmission and the data transmission, and/or can be separate (and/or different) for each transmission or type of transmission. In this latter example, waveform determining component 252 can determine a different waveform for the data transmission based on a capability of the UE 104 and/or other UEs that is specific to data transmissions. As described above, waveform determining component 252 can receive the UE capabilities and can accordingly determine the waveform based on one or more of the UE capabilities of one or more other UEs.

In an example, in determining the data waveform at Block 416 in method 400, optionally at Block 422, the data waveform can be determined based on the channel reservation sequence or DM-RS transmission. In an aspect, waveform indicating component 254, e.g., in conjunction with processor(s) 212, memory 216, transceiver 202, communicating component 142, etc., can determine the data waveform based on the channel reservation sequence or DM-RS transmission. As described above with respect to the control waveform (e.g., in Block 414), for example, waveform determining component 252 can determine the data waveform based on one or more properties of the channel reservation sequence or DM-RS transmission (e.g., cyclic shift, base sequence, etc.), and/or can determine the data waveform to be the same as the control waveform based on the determination at Block 414, and/or the like.

In an example, in determining the data waveform at Block 416 in method 400, optionally at Block 424, the data waveform can be determined based on the control information transmission. In an aspect, waveform indicating component 254, e.g., in conjunction with processor(s) 212, memory 216, transceiver 202, communicating component 142, etc., can determine the data waveform based on the control information transmission. For example, waveform determining component 252 can determine the type of waveform for the data transmission (e.g., CP-OFDM, DFT-S-OFDM, etc.) based on a value in control information received as part of the control information transmission. For example, the value may include one or more values of a bit or bitmap designated to indicate the type of waveform (e.g., independently or relative to the waveform of the control information transmission).

In another example, waveform determining component 252 can determine the control waveform and/or data waveform based on performing blind decoding using hypotheses based on the different waveform types.

In method 400, at Block 426, control information can be decoded from the control information transmission based on the control waveform. In an aspect, communicating component 142, e.g., in conjunction with processor(s) 212, memory 216, transceiver 202, etc., can decode the control information from the control information transmission based on the control waveform. For example, communicating component 142 can perform channel estimation based on the determined waveform, perform blind decoding of the control channel (e.g., PSCCH) based on the determined waveform (and hypotheses based on other parameters), etc. In addition, communicating component 142 may decode the control information based on a determined frequency allocation. For example, communicating component 142 can determine the frequency allocation size for the control information transmission based on the waveform being used and/or based on the frequency allocation size of the channel reservation sequence (e.g., where the channel reservation sequence length can be an integral multiple of the subchannel size). For example, for CP-OFDM waveform, communicating component 142 can determine the frequency allocation for the control information transmission to be the same as the channel reservation sequence length in number of resource elements. For example, for DFT-S-OFDM waveform, communicating component 142 can determine the frequency allocation for the control information transmission to be a largest number equal or less than the channel reservation sequence length in number of resource elements, subject to the DFT size constraint of $2^x 3^y 5^z$. In addition, communicating component 142 can transmit the control information transmission to one or more other devices or UEs (e.g., in a V2X or other D2D communication, such as over a PSCCH).

In method 400, at Block 428, data can be decoded from the data transmission based on the data waveform. In an aspect, communicating component 142, e.g., in conjunction with processor(s) 212, memory 216, transceiver 202, etc., can decode the data from the data transmission based on the data waveform. For example, communicating component 142 can perform channel estimation based on the determined waveform, perform blind decoding of the data channel (e.g., PSSCH) based on the determined waveform (and hypotheses based on other parameters), etc. In addition, communicating component 142 may decode the data based on a determined frequency allocation, which can be determined as described above to be the same as, and/or independently of, a frequency allocation for the control information transmission.

Figure 6:
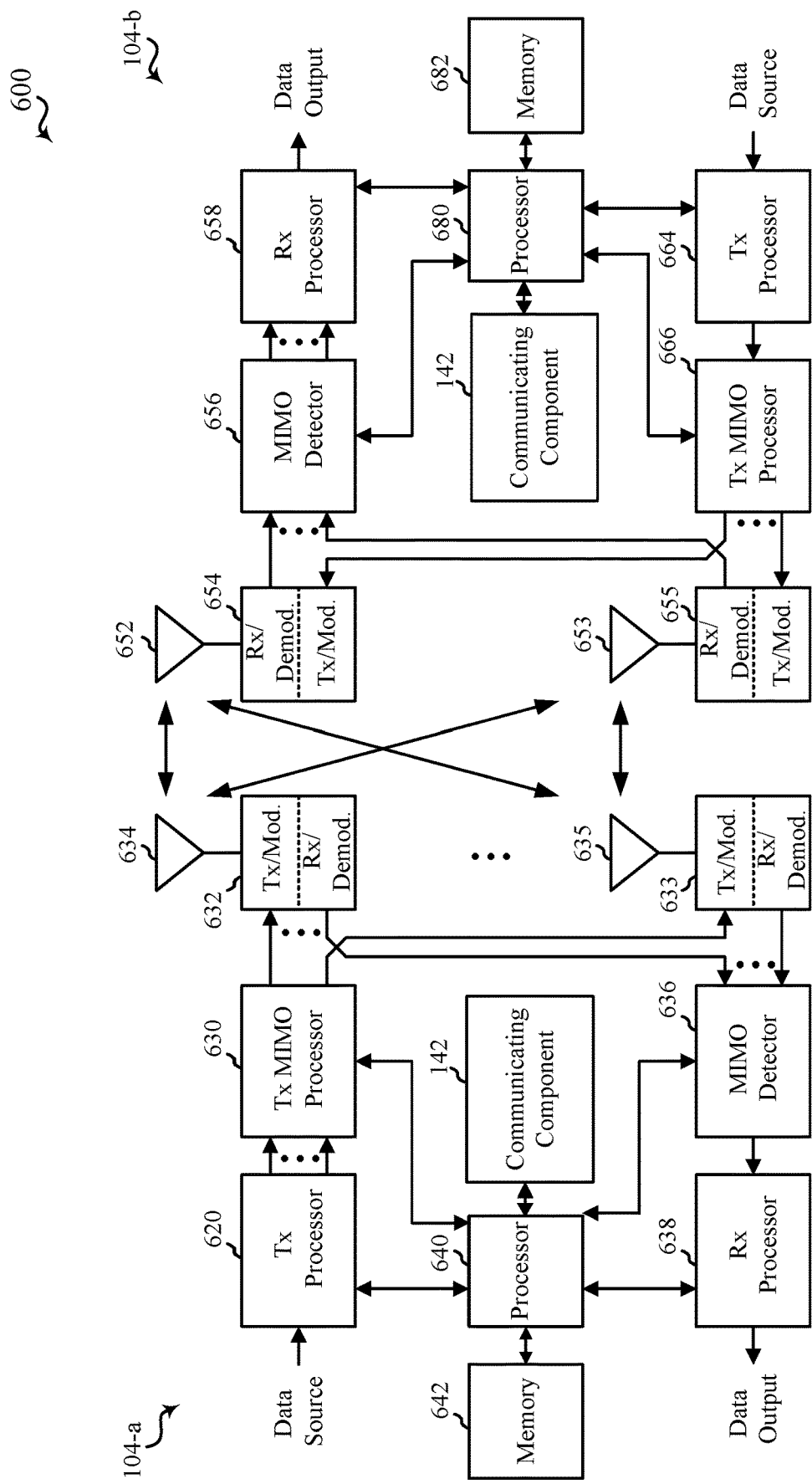
FIG. 6 is a block diagram illustrating an example of a MIMO communication system including a base station and a UE, in accordance with various aspects of the present disclosure.

FIG. 6 is a block diagram of a MIMO communication system 600 including UEs 104-a, 104-b. The MIMO communication system 600 may illustrate aspects of the wireless communication access network 100 described with reference to FIG. 1. The UE 104-a may be an example of aspects of the UE 104 described with reference to FIGS. 1-2. The UE 104-a may be equipped with antennas 634 and 635, and the UE 104-b may be equipped with antennas 652 and 653. In the MIMO communication system 600, the UEs 104-a, 104-b may be able to send data over multiple communication links at the same time. Each communication link may be called a "layer" and the "rank" of the communication link may indicate the number of layers used for communication. For example, in a 2×2 MIMO communication system where UE 104-a transmits two "layers," the rank of the communication link between the UE 104-a and the UE 104-b is two.

At the UE 104-a, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104-b may be an example of aspects of the UEs 104 described with reference to FIGS. 1-2. At the UE 104-b, the UE antennas 652 and 653 may receive the signals from the UE 104-a (e.g., over a sidelink) and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104-b to a data output, and provide decoded control information to a processor 680, or memory 682.

The processor 680 may in some cases execute stored instructions to instantiate a communicating component 142 (see e.g., FIGS. 1 and 2).

At the UE 104-b, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the UE 104-a in accordance with the communication parameters received from the UE 104-a. At the UE 104-a, the signals from the UE 104-b may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a communicating component 142 (see e.g., FIGS. 1 and 2).

The components of the UEs 104-a, 104-b may, individually or collectively, be implemented with one or more ASICs adapted to perform some or all of the applicable functions in hardware. Each of the noted modules may be a means for performing one or more functions related to operation of the MIMO communication system 600. Similarly, the components of the UE 104-a may, individually or collectively, be implemented with one or more ASICs adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples of the present invention is provided:

1. A method of wireless communication, comprising:
   determining a control waveform for transmitting a control information transmission related to a data transmission as one of multiple waveforms;
   determining a data waveform for transmitting the data transmission as one of the multiple waveforms;
   transmitting the control information transmission based on the control waveform; and
   transmitting the data transmission based on the data waveform.

2. The method of example 1, wherein the multiple waveforms include a cyclic prefix orthogonal frequency division multiplexing (CP-OFDM) waveform and a discrete Fourier transform spread orthogonal frequency division multiplexing (DFT-S-OFDM) waveform.

3. The method of any of examples 1 or 2, wherein at least one of determining the control waveform or determining the data waveform is based at least in part on a received resource pool configuration indicating one or more of the multiple waveforms supported for a resource pool configured for transmitting the control waveform or the data waveform.

4. The method of example 3, wherein determining a base sequence for transmitting a demodulation reference signal (DM-RS) for the control information transmission or the data transmission is based at least in part on the received resource pool configuration.

5. The method of any of examples 1 to 4, wherein at least one of determining the control waveform or determining the data waveform is based at least in part on a user equipment (UE) capability.

6. The method of any of examples 1 to 5, wherein at least one of determining the control waveform or determining the data waveform is based at least in part on a received indication of a user equipment (UE) capability from another UE.

7. The method of any of examples 1 to 6, further comprising of indicating the data waveform in control information transmitted in the control information transmission.

8. The method of any of examples 1 to 7, wherein the data waveform is indicated using a demodulation reference signal (DM-RS) associated with the control information transmission.

9. The method of example 8, wherein the data waveform is indicated using a determined cyclic shift of a base sequence of the DM-RS.

10. The method of any of examples 8 or 9, wherein the data waveform is indicated using a determined DM-RS base sequence of the DM-RS.

11. The method of any of examples 1 to 10, wherein determining the data waveform comprises determining the data waveform to be the same as the control waveform.

12. The method of any of examples 1 to 11, further comprising transmitting a demodulation reference signal (DM-RS) that indicates the control waveform.

13. The method of example 12, wherein the control waveform is indicated using a determined cyclic shift of a base sequence of the DM-RS.

14. The method of any of examples 12 or 13, wherein the control waveform is indicated using a determined DM-RS base sequence of the DM-RS.

15. The method of any of examples 1 to 14, further comprising
  transmitting a channel reservation sequence together with the control information transmission and the data transmission within a given transmission time interval, and
  indicating the control waveform at least in part using the channel reservation sequence.

16. The method of example 15, wherein the control waveform is indicated using a determined cyclic shift of a base sequence of the channel reservation sequence.

17. The method of any of examples 15 or 16, wherein the control waveform is indicated using a determined base sequence of the channel reservation sequence.

18. The method of any of examples 1 to 17, further comprising transmitting a channel reservation sequence over a frequency allocation, wherein transmitting at least one of the control information transmission or the data transmission is over the frequency allocation.

19. The method of any of examples 1 to 18, further comprising transmitting a channel reservation sequence over a frequency allocation, wherein transmitting at least one of the control information transmission or the data transmission is over a constrained frequency allocation that is equal or less than the frequency allocation in size.

20. A method of wireless communication, comprising:
  receiving a control information transmission based on a control waveform;
  receiving a data transmission based on a data waveform;
  determining the control waveform for the control information transmission as one of multiple waveforms;
  determining the data waveform for the data transmission as one of the multiple waveforms;
  decoding control information from the control information transmission based on the control waveform; and
  decoding data from the data transmission based on the data waveform.

21. The method of example 20, wherein the multiple waveforms include a cyclic prefix orthogonal frequency division multiplexing (CP-OFDM) waveform and a discrete Fourier transform spread orthogonal frequency division multiplexing (DFT-S-OFDM) waveform.

22. The method of example 21, wherein at least one of determining the control waveform or determining the data waveform is based at least in part on a received resource pool configuration indicating one or more of the multiple waveforms supported for a resource pool configured for transmitting the control waveform or the data waveform.

23. The method of any of examples 21 or 22, wherein determining the data waveform is based at least in part on the control information transmission.

24. The method of example 23, wherein determining the data waveform is based at least in part on control information received in the control information transmission.

25. The method of any of examples 21 to 24, wherein determining the data waveform is based at least in part on a demodulation reference signal (DM-RS) received in association with the control information transmission.

26. The method of example 25, wherein determining the data waveform is based at least in part on a determined cyclic shift of a base sequence of the DM-RS.

27. The method of any of examples 25 or 26, wherein determining the data waveform is based at least in part on a determined DM-RS base sequence of the DM-RS.

28. The method of any of examples 21 to 27, wherein determining the data waveform comprises determining the data waveform to be the same as the control waveform.

29. The method of any of examples 21 to 28, further comprising receiving a channel reservation sequence that indicates the control waveform.

30. The method of example 29, wherein determining the data waveform is based at least in part on a determined cyclic shift of a base sequence of the channel reservation sequence.

31. The method of any of examples 29 to 30, wherein determining the data waveform is based at least in part on a determined base sequence of the channel reservation sequence.

32. The method of any of examples 21 to 31, further comprising
  receiving a channel reservation sequence together with the control information transmission and the data transmission within a given transmission time interval, and wherein determining the control waveform is based at least in part on the channel reservation sequence.

33. The method of example 32, determining the control waveform is based at least in part on a determined cyclic shift of a base sequence of the channel reservation sequence.

34. The method of any of examples 32 or 33, determining the control waveform is based at least in part on a determined base sequence of the channel reservation sequence.

35. The method of any of examples 21 to 34, further comprising receiving a channel reservation sequence over a frequency allocation, wherein receiving at least one of the control information transmission or the data transmission is over the frequency allocation.

36. The method of any of examples 21 to 35, further comprising receiving a channel reservation sequence over a frequency allocation, wherein transmitting at least one of the control information transmission or the data transmission is over a constrained frequency allocation that is less than the frequency allocation in size.

37. An apparatus for wireless communication, comprising:
  a transceiver;
  a memory configured to store instructions; and
  one or more processors communicatively coupled with the transceiver and the memory, wherein the one or more processors are configured to execute the instructions to perform the operations of any of the examples 1 to 36.

38. An apparatus for wireless communication, comprising means for performing the operations of any of the examples 1 to 36.

39. A computer-readable medium, comprising code executable by one or more processors to perform the operations of any of the examples 1 to 36.

What is claimed is:

1. A method of wireless communication, comprising:
transmitting a control information transmission based on a control waveform, wherein the control waveform is selected from multiple waveforms possible for transmitting the control information transmission related to a data transmission;
transmitting the data transmission based on a data waveform, wherein the data waveform is selected from the multiple waveforms; and
transmitting a channel reservation sequence over a frequency allocation, wherein transmitting at least one of the control information transmission or the data transmission is over at least a portion of the frequency allocation.

2. The method of claim 1, wherein the multiple waveforms include a cyclic prefix orthogonal frequency division multiplexing (CP-OFDM) waveform and a discrete Fourier transform spread orthogonal frequency division multiplexing (DFT-S-OFDM) waveform.

3. The method of claim 1, wherein at least one of the control waveform or the data waveform is selected based at least in part on a received resource pool configuration indicating one or more of the multiple waveforms supported for a resource pool configured for transmitting the control waveform or the data waveform.

4. The method of claim 3, wherein determining a base sequence for transmitting a demodulation reference signal (DM-RS) for the control information transmission or the data transmission is based at least in part on the received resource pool configuration.

5. The method of claim 1, wherein at least one of the control waveform or the data waveform is selected based at least in part on a user equipment (UE) capability.

6. The method of claim 1, wherein at least one of the control waveform or the data waveform is selected based at least in part on a received indication of a user equipment (UE) capability from another UE.

7. The method of claim 1, further comprising of indicating the data waveform in control information transmitted in the control information transmission.

8. The method of claim 1, wherein the data waveform is indicated using a demodulation reference signal (DM-RS) associated with the control information transmission.

9. The method of claim 8, wherein the data waveform is indicated using a determined cyclic shift of a base sequence of the DM-RS.

10. The method of claim 8, wherein the data waveform is indicated using a determined DM-RS base sequence of the DM-RS.

11. The method of claim 1, wherein the data waveform is selected to be the same as the control waveform.

12. The method of claim 1, further comprising transmitting a demodulation reference signal (DM-RS) that indicates the control waveform.

13. The method of claim 12, wherein the control waveform is indicated using a determined cyclic shift of a base sequence of the DM-RS.

14. The method of claim 12, wherein the control waveform is indicated using a determined DM-RS base sequence of the DM-RS.

15. The method of claim 1, further comprising:
transmitting the channel reservation sequence together with the control information transmission and the data transmission within a given transmission time interval, and
indicating the control waveform at least in part using the channel reservation sequence.

16. The method of claim 15, wherein the control waveform is indicated using a determined cyclic shift of a base sequence of the channel reservation sequence.

17. The method of claim 15, wherein the control waveform is indicated using a determined base sequence of the channel reservation sequence.

18. The method of claim 1, wherein at least the portion of the frequency allocation is a constrained frequency allocation that is equal or less than the frequency allocation in size.

19. An apparatus for wireless communication, comprising:
a transceiver;
a memory configured to store instructions; and
one or more processors communicatively coupled with the transceiver and the memory, wherein the one or more processors are configured to execute the instructions to:
transmit a control information transmission based on control waveform, wherein the control waveform is selected from multiple waveforms possible for transmitting the control information transmission related to a data transmission;
transmit the data transmission based on a data waveform, wherein the data waveform is selected from the multiple waveforms; and
transmit a channel reservation sequence over a frequency allocation, wherein the one or more processors are configured to transmit at least one of the control information transmission or the data transmission over at least a portion of the frequency allocation.

20. The apparatus of claim 19, wherein the multiple waveforms include a cyclic prefix orthogonal frequency division multiplexing (CP-OFDM) waveform and a discrete Fourier transform spread orthogonal frequency division multiplexing (DFT-S-OFDM) waveform.

21. The apparatus of claim 19, wherein at least one of the control waveform or the data waveform is selected based at least in part on a received resource pool configuration indicating one or more of the multiple waveforms supported for a resource pool configured for transmitting the control waveform or the data waveform.

22. The apparatus of claim 19, wherein at least one of the control waveform or the data waveform is selected based at least in part on at least one of a user equipment (UE) capability or a received indication of a capability from another UE.

23. The apparatus of claim 19, wherein the one or more processors are further configured to execute the instructions to indicate the data waveform in control information transmitted in the control information transmission, including at least one of using a demodulation reference signal (DM-RS) associated with the control information transmission, using a determined cyclic shift of a base sequence of the DM-RS, or using a determined DM-RS base sequence of the DM-RS to indicate the data waveform.

24. The apparatus of claim 19, wherein the data waveform is selected to be the same as the control waveform.

25. The apparatus of claim 19, wherein the one or more processors are configured to execute the instructions to transmit a demodulation reference signal (DM-RS) that indicates the control waveform by at least one of using a determined cyclic shift of a base sequence of the DM-RS, or using a determined DM-RS base sequence of the DM-RS.

26. The apparatus of claim 19, wherein the one or more processors are further configured to execute the instructions to:
  transmit the channel reservation sequence together with the control information transmission and the data transmission within a given transmission time interval, and
  indicate the control waveform at least in part using the channel reservation sequence by at least one of using a determined cyclic shift of a base sequence of the channel reservation sequence or using a determined base sequence of the channel reservation sequence.

27. The apparatus of claim 19, wherein at least the portion of the frequency allocation is a constrained frequency allocation that is less than the frequency allocation in size.

28. An apparatus for wireless communication, comprising:
  means for transmitting a control information transmission based on a control waveform, wherein the control waveform is selected from multiple waveforms possible for transmitting the control information transmission related to a data transmission;
  means for transmitting the data transmission based on a data waveform, wherein the data waveform is selected from the multiple waveforms; and
  means for transmitting a channel reservation sequence over a frequency allocation, wherein the means for transmitting at least one of the control information transmission or the data transmission transmits over at least a portion of the frequency allocation.

29. A non-transitory computer-readable medium, comprising code executable by one or more processors for wireless communication, the code comprising code for:
  transmitting a control information transmission based on a control waveform, wherein the control waveform is selected from multiple waveforms possible for transmitting the control information transmission related to a data transmission;
  transmitting the data transmission based on a data waveform, wherein the data waveform is selected from the multiple waveforms; and
  transmitting a channel reservation sequence over a frequency allocation, wherein the code for transmitting at least one of the control information transmission or the data transmission transmits over at least a portion of the frequency allocation.

* * * * *